United States Patent
Yang et al.

(10) Patent No.: US 8,439,519 B2
(45) Date of Patent: May 14, 2013

(54) LIGHTING APPARATUS

(75) Inventors: Haeng Seok Yang, Gyeonggi-do (KR); Sang Kyeong Yun, Gyeonggi-do (KR); Chang Seob Kim, Seoul (KR); Jin Sun Jung, Gyeonggi-do (KR); Tae Keun Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 12/816,905

(22) Filed: Jun. 16, 2010

(65) Prior Publication Data

US 2011/0242804 A1 Oct. 6, 2011

(30) Foreign Application Priority Data

Mar. 30, 2010 (KR) .................. 10-2010-0028259

(51) Int. Cl.
*F21V 8/00* (2006.01)

(52) U.S. Cl.
USPC ......................................... 362/231; 362/612

(58) Field of Classification Search .............. 362/612, 362/614, 231, 246
See application file for complete search history.

(56) References Cited

U.S. PATENT DOCUMENTS

| | | | |
|---|---|---|---|
| 6,840,646 B2 | 1/2005 | Cornelissen et al. | |
| 2005/0099791 A1* | 5/2005 | Nagel | 362/31 |
| 2005/0135117 A1* | 6/2005 | Lamb et al. | 362/615 |
| 2007/0058393 A1* | 3/2007 | Kim et al. | 362/613 |
| 2007/0081321 A1* | 4/2007 | Ahn et al. | 362/97 |
| 2012/0300494 A1* | 11/2012 | Watabe et al. | 362/602 |

FOREIGN PATENT DOCUMENTS

| | | |
|---|---|---|
| EP | 0351108 A2 | 1/1990 |
| EP | 1801639 A1 | 6/2007 |
| KR | 10-2004-0066650 A | 7/2004 |
| KR | 1020060114603 A | 11/2006 |
| KR | 2020090008749 | 8/2009 |
| WO | WO 0005620 | 2/2000 |

OTHER PUBLICATIONS

Communication issued Feb. 3, 2012 by the Korean Intellectual Property Office in counterpart Korean Application No. 10-2010-0028259.
Communication dated Jul. 14, 2011 issued by the Korean Intellectual Property Office in counterpart Korean Patent Application No. 10-2010-0028259.
Communication dated Jul. 26, 2010 issued by the European Patent Office in counterpart European Patent Application No. 10006211.6.

* cited by examiner

*Primary Examiner* — David V Bruce
(74) *Attorney, Agent, or Firm* — Sughrue Mion, PLLC

(57) ABSTRACT

Disclosed herein is a lighting apparatus. The lighting apparatus includes: a first light emitting unit including one or more main light sources radiating white light downward; one or more second light emitting units formed at the sides under the first light emitting unit and including one or more sub-light sources radiating color light that is mixed with the white light radiated from the first light emitting unit; and a light guide plate mixing the white light radiated from the main light sources and the color light radiated from the sub-light sources and radiating the mixed light downward.

According to the embodiments, it is possible to remove non-uniformity of luminance of the lighting apparatus that can control color temperature by efficiently disposing main light sources radiating white light and sub-light sources radiating color light. Further, it is possible to increase efficiency of the lighting apparatus by radiating light, using all of the main light sources even at any color temperature.

8 Claims, 2 Drawing Sheets

108

LIGHTING APPARATUS

CROSS REFERENCE TO RELATED APPLICATION

This application claims the benefit of Korean Patent Application No. 10-2010-0028259, filed on Mar. 30, 2010, entitled "Lighting Apparatus", which is hereby incorporated by reference in its entirety into this application.

BACKGROUND OF THE INVENTION

1. Technical Field

The present invention relates to a lighting apparatus, and more particularly, to a lighting apparatus that can control color temperature.

2. Description of the Related Art

Light emitting diodes (LEDs) are used for light sources in various fields, because they have long life and consume small power without emitting harmful wavelengths and containing environmentally harmful substances. In particular, these light emitting diodes have recently started to be used for interior lighting and are expected to be commonly used in the future.

Meanwhile, recently, a demand for lighting apparatuses that can control color temperature, if needed, has increased for eyesight protection, sentiment control, concentration improvement, particularly in the inferior lighting field. For example, using lighting apparatuses that can control color temperature in classrooms, it is possible to reduce color temperature to 2500~3000 K when studying mathematics to increase concentration and increase the color temperature to 6500~7000 K when studying art subjects, such as art or music to achieve abundant sensitivity.

Lighting using two light modules having different color temperature and alternately disposed has been used in the related art to control the color temperature of the lighting. For example, the color temperature is controlled by alternately disposing a light module having color temperature of 2500 k and a light module having color temperature of 6000 K and adjusting intensity of lighting of the each of the light modules. This method, however, has a problem in that the entire luminance is not uniform because light modules having different color temperature are disposed in one lighting apparatus (that is, the light modules look stained). Further, since the color temperature is controlled by adjusting the intensity of lighting of each of the light modules, only some of the light modules are used in accordance with color temperature (e.g. only the half the entire modules emits light, because it is required to turn off all the light modules having color temperature of 6000 K in order to achieve color temperature of 2500 K), such that efficiency of the lighting apparatuses are decreased.

SUMMARY OF THE INVENTION

The present invention has been made in an effort to provide a lighting apparatus that can output uniform luminance and efficiently use each of light sources.

An exemplary embodiment of the present invention provides a lighting apparatus including: a first light emitting unit including one or more main light source radiating white light downward; one or more second light emitting unit formed at the sides under the first light emitting unit and including one or more sub-light sources radiating color light that is mixed with the white light radiated from the first light emitting unit; and a light guide plate mixing the white light radiated from the main light source and the color light radiated from the sub-light source and radiating the mixed light downward.

In this configuration, the main light source or the sub-light source may include a light emitting diode (LED) or a cold cathode fluorescent lamp (CCFL), and the sub-light source may include one or more color light sources of red light, blue light, green light, and yellow light.

Further, the second light emitting unit may be disposed under the first light emitting unit such that the color light source radiating red light and the color light source radiating blue light face each other.

Meanwhile, another embodiment of the present invention provides a lighting apparatus including: a first light emitting unit including one or more sub-light sources radiating color light downward; one or more second light emitting unit formed at the sides under the first light emitting unit and including one or more main light sources radiating white light that is mixed with the color light radiated from the first light emitting unit; and a light guide plate mixing the white light radiated from the main light source and the color light radiated from the sub-light source and radiating the mixed light downward.

In this configuration, the main light source or the sub-light source may include a light emitting diode (LED) or a cold cathode fluorescent lamp (CCFL), and the sub-light source may includes one or more color light sources of red light, blue light, green light, and yellow light.

DESCRIPTION OF THE PREFERRED EMBODIMENTS

Hereinafter, detailed embodiments of the present invention will be described with reference to the accompanying drawings. However, the embodiments are just examples and the present invention is not limited thereto.

In describing the present invention, a detailed description of well-known technology relating to the present invention may unnecessarily make unclear the spirit of the present invention, thus the detailed description is not provided. Further, the following terminologies are defined in consideration of the functions in the present invention and may be construed in different ways by the intention of users and operators. Therefore, the definition should be made on the basis of the description of the specification.

As a result, the spirit of the present invention is determined by the claims and the following embodiments are provided to efficiently describe the spirit of the present invention for those skilled in the art.

Figure 1:
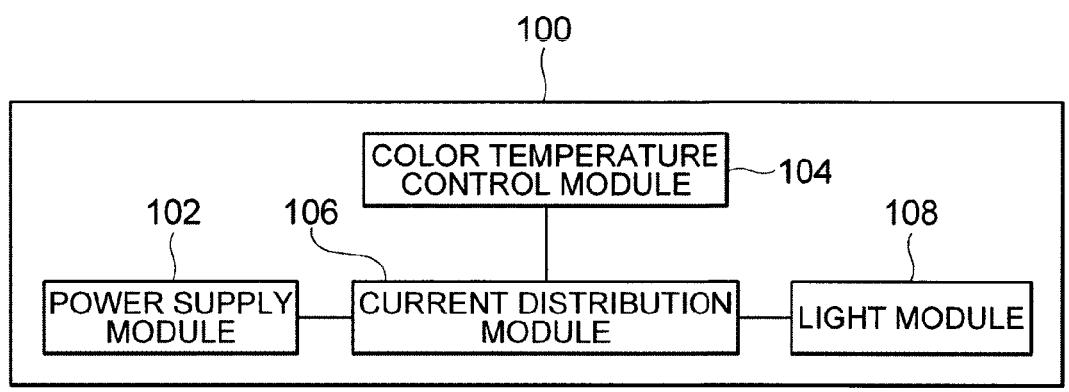
FIG. 1 is a block diagram illustrating the configuration of a lighting apparatus 100 according to an embodiment of the present invention.

FIG. 1 is a block diagram illustrating the configuration of a lighting apparatus 100 according to an embodiment of the present invention.

As shown in the figure, the lighting apparatus 100 according to an embodiment of the present invention includes a power supply module 102, a color temperature control module 104, a current distribution module 106, and a light module 108.

The power supply module 102, a module supplying power for operating the lighting apparatus 100, receives common alternating current, converts it into direct current and supplies the direct current to the current distributing module 106. It should be understood that the shape and function of the power supply module 102 according to an embodiment of the present invention may change in accordance with the types of power source and light module 108 used therein.

The color temperature control module 104 is a module controlling color temperature of light emitted from the lighting apparatus 100. For this purpose, the color temperature control module 104 may include a wire or wireless communication module (not shown) for receiving color temperature control signals from the outside, and can generate a current control signal in response to the color temperature control signal through the communication module and then transmit the current control signal to the current distributing module 106.

The current distributing module 106 is a module supplying current to each of the light sources in the light module 108. The current distributing module 106 controls color temperature of light emitted from the light module 108 by receiving a current control signal from the color temperature control module 104 and adjusting the amount of current that is supplied to each of the light sources in the light module 108 in response to the current control signal.

The light module 108 includes a plurality of light sources and each of the light sources emits light in accordance with the current supplied from the current distributing module 106. The detailed shape of the light module 108 and the arrangement of the light sources will be described with reference to FIGS. 2 and 3.

First Embodiment

Figure 2:
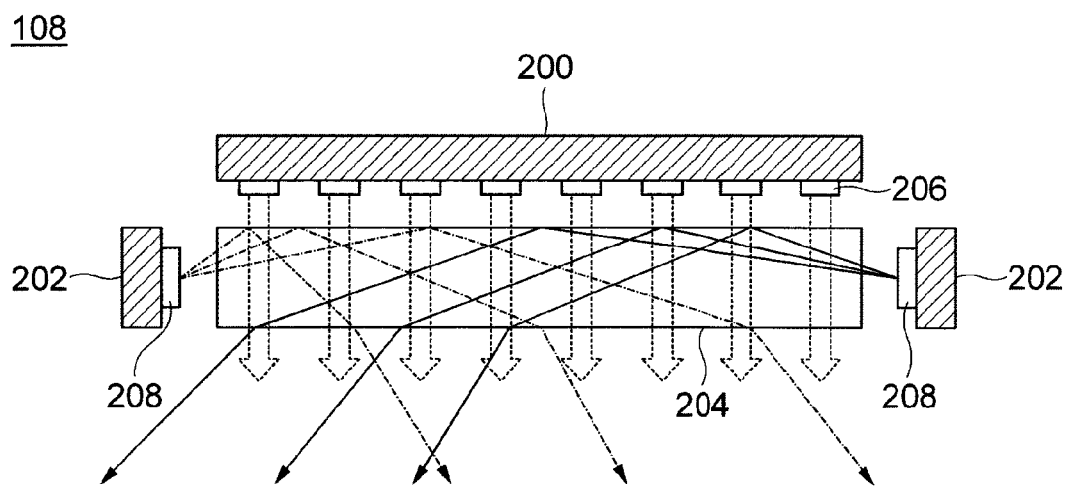
FIG. 2 is a view illustrating the detailed configuration of a light module 108 according to a first embodiment of the present invention.

FIG. 2 is a view illustrating the detailed configuration of a light module 108 according to a first embodiment of the present invention.

As shown in the figure, the light module 108 according to the first embodiment of the present invention includes a first light emitting unit 200, a second light emitting unit 202, and a light guide plate 204.

The first light emitting unit 200 is disposed at the upper end of the light module 108 and includes one or more main light sources 206 radiating white light downward. The main light sources 206, for example, may be light emitting diodes (LEDs) radiating white light or cold cathode fluorescent lamps (CCFL) and arranged uniformly on the bottom of the first light emitting unit 200 to radiate downward white light having uniform luminance.

The second light emitting unit 202 is disposed under the first light emitting unit 200 and includes one or more sub-light sources 208 radiating color light that is mixed with the white light radiated from the main light sources 206 of the first light emitting unit 200. The light module 108 may be provided with one or more of the second light emitting units 202 in accordance with the shape of the first light emitting unit 200. For example, as shown in FIG. 2, when the first light emitting unit 200 extends in one direction, two second light emitting units 202 may be disposed at both sides of the first light emitting unit 202. Further, for example, when the first light emitting unit 200 is formed in a circular shape, the second light emitting unit 202 may be formed to surround the first light emitting unit 200.

The sub-light sources 208, light sources for controlling color temperature of the white light radiated from the first light emitting unit 200, may include one or more color light sources of red, blue, green, or yellow, in accordance with embodiments. For example, as shown in FIG. 2, two second light emitting units 202 are disposed to face each other under the first light emitting unit 200, the sub-light source 208 at the left in the figure may radiate blue light and the sub-light source 208 at the right may radiate red light. In this configuration, in order to increase color temperature of the white light radiated from the main light source 206, the sub-light source 208 of the second light emitting unit 202 radiates blue light, while, in order to decrease the color temperature, the sub-light source 208 radiates red light to be mixed with the white light, thereby controlling the color temperature of the white light.

Further, in order that color light is uniformly radiated from the sub-light source 208, the second light emitting unit shown in FIG. 2 may be formed to have both blue light and red light (additionally, green light and yellow light). In this case, the second light emitting unit 202 may selectively radiate only light of desired colors from each color light, by the control of the current distributing module 106.

Similar to the main light source 206, the sub-light sources 208 may be light emitting diodes or cold cathode fluorescent lamps.

The light guide plate 204 provides an optical path for the color light radiated from the sub-light source 208 of the second light emitting unit 202 and radiates downward the mixed light of the white light radiated from the main light source 206 and the color light radiated from the sub-light source 208. The arrows with dotted lines in the figure indicate the white light radiated from the main light sources 206 and the arrows with solid lines and chain lines indicate the color light radiated from the sub-light sources 208.

In the light module 108 having the above configuration, the white light radiated from the main light sources 206 changes in color temperature while mixed with the color light radiated from the sub-light sources 208 through the light guide plate 204, and is then radiated downward. As described above, in this embodiment of the present invention, since the white light and the color light are mixed through the light guide plate 204, non-uniformity of luminance that is usually seen in light modules for controlling color temperature can be removed.

Further, in this embodiment of the present invention, since the entire luminance is adjusted by the main light sources 206 and the color temperature is adjusted by the sub-light sources 208, it is possible to use all the white light of the main light sources 206 even at any color temperature, thereby increasing efficiency of the light module 108.

Second Embodiment

Figure 3:
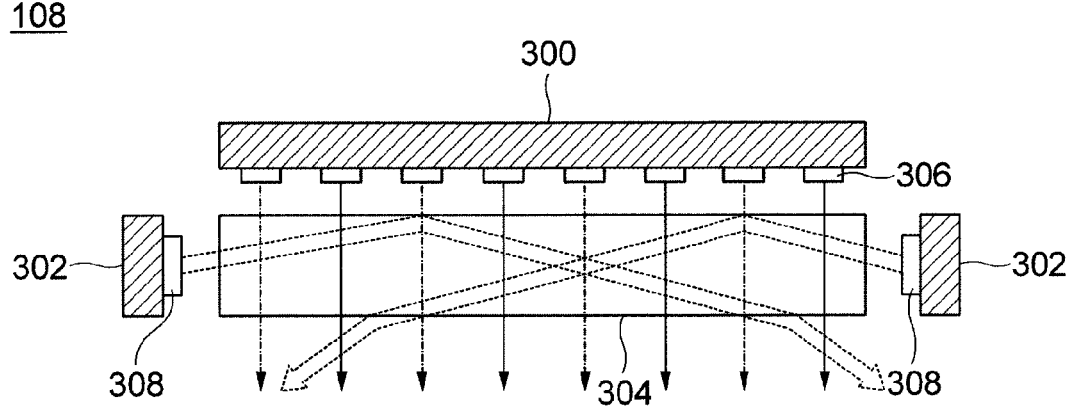
FIG. 3 is a view illustrating the detailed configuration of a light module 108 according to a second embodiment of the present invention.

FIG. 3 is a view illustrating the detailed configuration of a light module 108 according to a second embodiment of the present invention.

As shown in the figure, the light source 108 according to the second embodiment of the present invention includes a first light emitting unit 300, a second light emitting unit 302, and a light guide plate 304.

The first light emitting unit 300 is disposed at the upper end of the light module 108 and includes one or more sub-light sources 306 radiating color light downward. The sub-light sources 206 may be light emitting diodes (LED) or cold cathode fluorescent lamps (CCFL), and according to the embodiment, they may include one or more color light sources of red, blue, green, or yellow. It is possible to minimize non-uniformity of the entire light by uniformly disposing the color light sources corresponding to each color under the first light emitting unit 300.

The second light emitting unit 302 is disposed under the first light emitting unit 300 and includes one or more main light sources 208 radiating white light that is mixed with the color light radiated from the sub-light sources 306 of the first light emitting unit 300. That is, unlike the first embodiment, the sub-light sources 306 are disposed at the upper portion and the main light sources 308 are disposed at the sides in this embodiment.

The light module 108 may be provided with one or more of the second light emitting units 302 in accordance with the shape of the first light emitting unit 300. For example, as shown in FIG. 3, the first light emitting unit 300 extends in one direction, two second light emitting units 302 may be disposed at both sides of the first light emitting unit 300. Further, for example, when the first light emitting unit 300 is formed in a circular shape, the second light emitting unit 302 may be formed to surround the first light emitting unit 300 such that the main light sources 308 are disposed inside.

Similar to the sub-light sources 306, the main light sources 308 may also be light emitting diodes or cold cathode fluorescent lamps.

The light guide plate 304 provides an optical path for the white light radiated from the main light source 308 of the second light emitting unit 302 and radiates downward the mixed light of the color light radiated from the sub-light source 306 and the white light radiated from the main source 308. The arrows with dotted lines in the figure indicate the white light radiated from the main light sources 308 and the arrows with solid lines and chain lines indicate the color light radiated from the sub-light sources 306.

In the light module 108 having the above configuration, the white light laterally radiated from the main light sources 308 to the light guide plate 304 changes in color temperature while mixed with the color light radiated from the sub-light sources 306 through the light guide plate 304, and is then radiated downward. As described above, in this embodiment of the present invention, since the white light and the color light are mixed through the light guide plate 304, non-uniformity of luminance that is usually seen in light modules for controlling color temperature can be removed.

Further, in this embodiment of the present invention, similar to the first embodiment, since the entire luminance is adjusted by the main light sources 308 and the color temperature is adjusted by the sub-light sources 306, it is possible to use all the white light of the main light sources 308 even at any color temperature, thereby increasing efficiency of the light module 108.

According to the present invention, it is possible to remove non-uniformity of luminance of a lighting apparatus that can control color temperature by efficiently disposing main light sources radiating white light and sub-light sources radiating color light. Further, it is possible to increase efficiency of the lighting apparatus by radiating light, using all of the main light sources even at any color temperature.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A lighting apparatus comprising:
a first light emitting unit comprising one or more main light sources radiating white light in a downward direction;
a first secondary light emitting unit formed at a first side under the first light emitting unit and comprising at least one first sub-light source radiating color light, and a second secondary light emitting unit formed at a second side under the first light emitting unit and comprising at least one second sub-light source radiating color light, such that the at least one first sub-light source and the at least one second light source face each other; and
a light guide plate, disposed between the first secondary light source and the second secondary light source, which mixes the white light radiated from the one or more main light sources and the color light radiated from the first sub-light source and the second sub-light source, this outputting mixed light in the downward direction;
wherein the color light radiated by the at least one first sub-light source is a first color different from a second color light radiated by the least one second sub-light source.

2. The lighting apparatus according to claim 1, wherein each of the one or more main light sources, each of the at least one first sub-light source, and each of the at least one second sub-light source comprises one of a light emitting diode (LED) and a cold cathode fluorescent lamp (CCFL).

3. The lighting apparatus according to claim 1, wherein the at least one first sub-light source radiates red light, and the at least one second sub-light source radiates blue light.

4. A lighting apparatus comprising:
a light module comprising a plurality of light sources including one or more main light sources and one or more sub-light sources;
a power supply module for receiving alternating current and converting the alternating current into direct current;
a color temperature control module for receiving a color temperature control signal and generating a current control signal in response to the color temperature control signal; and
a current distributing module for receiving the direct current from the power supply module and supplying each of the light sources in the light module with an amount of current, wherein the amount of current that is supplied to each of the light sources is adjusted by the current distribution module in response to the current control signal;
wherein each of the light sources of the light module emits light in accordance with the amount of current supplied from the current distributing module, and the light module further comprises:
a first light emitting unit including one of more sub-light sources radiating color light downward;
one or more second light emitting units formed at the sides under the first light emitting unit and including one or more main light sources radiating white light that is mixed with the color light radiated from the first light emitting unit; and
a light guide plate mixing the white light radiated from the main light sources and the color light radiated from the sub-light sources and radiating the mixed light downward.

5. The lighting apparatus according to claim 4, wherein the main light source or the sub-light source includes a light emitting diode (LED) or a cold cathode fluorescent lamp (CCFL).

6. The lighting apparatus according to claim 4, wherein the sub-light source includes one or more color light sources of red light, blue light, green light, and yellow light.

7. A lighting apparatus comprising:
- a first light emitting unit comprising at least one main light source which radiates white light in a downward direction;
- a light guide plate disposed below the first light emitting unit; and
- a red second light emitting unit disposed at a first side of the light guide plate, and a blue second light emitting unit disposed at a second side of the light guide plate, opposite the first side, wherein the red second light emitting unit comprises a sub-light source which emits red light and the blue second light emitting unit comprises a sub-light source which emits blue light, such that the red light source and the blue light source face each other; and
- wherein white light from the first light emitting unit, red light from the red second light emitting unit, and blue light from the blue second light emitting unit are mixed within the light guide plate, such that mixed light is emitted from the light guide plate in a downward direction.

8. The lighting apparatus according to claim 7, wherein each of the at least one main light source, the sub-light source which radiates red light, and the sub-light source which radiates blue light comprises one of a light emitting diode and a cold cathode fluorescent lamp.

* * * * *